United States Patent [19]

Lobo et al.

[11] Patent Number: 4,817,752

[45] Date of Patent: Apr. 4, 1989

[54] AUTOMATIC FREE WHEELING HUB ASSEMBLY

[75] Inventors: Roberto J. H. Lobo; Mauricio Rysevas, both of Sao Paulo, Brazil

[73] Assignee: AVM-Auto Equipamentos LtDA, Sao Paulo, Brazil

[21] Appl. No.: 10,953

[22] Filed: Feb. 4, 1987

[30] Foreign Application Priority Data

Feb. 6, 1986 [BR] Brazil .................................. 8600514

[51] Int. Cl.⁴ .................... F16D 25/04; F16D 25/061; B60K 23/06
[52] U.S. Cl. ................................ 180/247; 192/67 R; 192/88 A; 403/1
[58] Field of Search ................ 192/67 R, 85 A, 85 V, 192/88 A, 50; 403/1; 180/247

[56] References Cited

U.S. PATENT DOCUMENTS

| | | | |
|---|---|---|---|
| 1,139,853 | 5/1915 | Dyer | 180/54.1 |
| 1,201,232 | 10/1916 | Archer | 180/246 |
| 1,440,341 | 12/1922 | Crispen | 74/710.5 |
| 2,620,054 | 12/1952 | Munschauer | 192/85 A |
| 2,639,014 | 5/1953 | Munschauer | 192/85 A |
| 2,639,795 | 5/1953 | Munschauer | 192/67 R |
| 2,708,993 | 5/1955 | Munschauer | 192/85 R |
| 2,770,150 | 11/1956 | Culverwell | 74/710 |
| 2,844,238 | 7/1958 | Peterson | 192/67 R UX |
| 2,883,025 | 4/1959 | McKim | 192/67 R UX |
| 2,913,929 | 11/1959 | Anderson | 74/710.5 |
| 3,055,471 | 9/1962 | Warn et al. | 192/45 |
| 3,058,558 | 10/1962 | Hawk | 192/67 R |
| 3,123,169 | 3/1964 | Young et al. | 180/247 |
| 3,442,361 | 5/1969 | Hegar | 192/67 R UX |
| 3,935,753 | 2/1976 | Williams | 74/650 |
| 3,941,199 | 3/1976 | Williams | 180/249 |
| 3,972,633 | 8/1976 | Wright | 403/1 |
| 3,986,588 | 10/1976 | Kuzarov | 192/16 |
| 4,004,780 | 1/1977 | Kuzarov | 254/345 |
| 4,033,552 | 7/1977 | Kuzarov | 254/342 |
| 4,123,040 | 10/1978 | Kuzarov | 254/342 |
| 4,147,226 | 4/1979 | Kleespies | 180/70.1 |
| 4,212,557 | 7/1980 | Overbeck | 403/1 |
| 4,222,472 | 9/1980 | Telford | 192/36 |
| 4,223,772 | 9/1980 | Telford | 192/48.6 |
| 4,266,646 | 5/1981 | Telford | 192/67 R |
| 4,282,949 | 8/1981 | Kopich et al. | 180/252 |
| 4,293,061 | 10/1981 | Brown | 192/67 R |
| 4,327,821 | 5/1982 | Telford | 192/35 |
| 4,341,281 | 7/1982 | Nagy | 180/247 |
| 4,365,696 | 12/1982 | Telford | 192/67 R |
| 4,625,846 | 12/1986 | Gomez | 192/67 R |
| 4,627,512 | 12/1986 | Clohessy | 180/247 |

FOREIGN PATENT DOCUMENTS

| | | | |
|---|---|---|---|
| PI-8102668 | 4/1985 | Brazil . | |
| 913969 | 6/1954 | Fed. Rep. of Germany | 192/67 R |
| 2098286 | 11/1982 | United Kingdom | 192/67 R |

Primary Examiner—David M. Mitchell
Assistant Examiner—Mitchell J. Hill
Attorney, Agent, or Firm—Cullen, Sloman, Cantor, Grauer, Scott & Rutherford

[57] ABSTRACT

The device for disconnecting the wheels from a vehicle's optional drive is mounted inside the support of the axle shaft, and the wheel hub is splined onto the axle shaft. The universal joint is diametrically positioned in relation to the support of the axle shaft by a bearing. The universal joint has an internal splined section which corresponds to an internal splined section on the clutch disc for "engage" and "disengage" positions. A fluid responsive actuating device is provided including a movable member in the form of a diaphragm or a piston connected to the clutch disc for axially moving, in response to the pressure or pressure differential from a fluid source to effect the engagement and disengagement of the clutch disc splines in relation to the axle shaft and universal joint splines.

20 Claims, 2 Drawing Sheets

AUTOMATIC FREE WHEELING HUB ASSEMBLY

BACKGROUND OF THE INVENTION

There are known mechanical devices, both manual and automatic, designed to connect or disconnect the wheels from a vehicle's optional drive axles in order to achieve or obtain a significant fuel economy. This occurs when the wheels are released from the referred optional drive axles since part of the power generated by the engine will no longer be wasted in moving the components of the optional drive system that exist between the vehicle's wheels and the transfer case.

The prior art manual mechanical devices are not convenient since the driver had to step out of the vehicle to connect or disconnect the optional drive. The conventional automatic devices have the disadvantage of not allowing for engine compression braking.

As further background for the present invention, free wheeling hub assemblies are designed to drivingly connect wheels to the associated driving wheel axles which are provided with splines and upon which end of the axles the hubs are mounted. It is known that four wheel drive vehicles are meant to operate in conditions under which the maximum traction capability is required. When these conditions arise, the second driving axle, most usually the front one, is engaged by transferring engine power to it through a transfer case.

Under normal 4×2 conditions, however, the front power train is disconnected from the transfer case, but continues to turn, "dragged" by the wheels. This results in the additional resistance which increases fuel consumption and tire wear, causing unnecessary wear of the front power train moving parts, and reduced driveability.

These undesirable consequences are eliminated by the use of a hub clutch on each wheel, through which it is possible to disconnect the wheels from the drive shafts when desired. In vehicles equipped with the free wheeling hubs, when driving in 4×2, the wheels will be the only moving parts of the front drive line, just like in any conventional 2 wheel drive vehicle.

In the last three decades, numerous free wheeling mechanisms have been devised including manual hubs, automatic roller type hubs, automatic cam type hubs and axle disconnecting mechanisms. Manual hubs connect or disconnect the wheels to the drive shafts through different mechanical means, the most reliable of which consists of a sliding clutch ring, contained in a housing fixed on to the wheel hub, and externally controlled by a manual dial. Although the manual free wheeling hub serves its purpose, and is durable and trouble free, it has the obvious disadvantage of the driver having to get out of the vehicle every time the four wheel drive is required.

In automatic roller type hubs, when torque is applied to the drive shafts, the hubs lock themselves through the wedging of rollers between an inner polyhedric body splined on the shaft and the race of a housing bolted on the wheel hub. Thus, the axle can drive the wheels but the wheels will not drag the power train. The main inconvenience of this mechanism is that engine compression braking cannot be applied to the front wheels, which, in difficult off-road operation, can be a serious handicap to the control of driver over vehicle.

In automatic cam type hubs the same principle as in the manual hub is applied, only that instead of being manually operated, the sliding clutch ring is displaced by a combination of cams and friction mechanism when torque is applied to the drive shaft. To disengage the hubs, it is necessary to stop the vehicle and reverse it, for the clutch ring to return to its original position. Although this type does allow for engine compression braking, its reliability appears to be doubtful. In addition to the inconvenience of having to back up the vehicle, this rather complicated construction requires regular servicing, can be noisy in rough off-road situations, such as forward/reverse vehicle rocking, and is subject to failure under extreme low temperatures.

In a disconnecting mechanism or system, instead of featuring a locking device on each wheel, it consists of a split drive shaft on one side of the front axle gear. The shaft remains split when operating in 4×2 and is locked together by a remote control sliding sleeve for 4×4 operation. This system does not really provide a full free wheeling effect. Even in 4×2, the wheels drag the drive shaft on one side, part of the drive shaft on the other, and the differential gears. Only the ring/pinion gear and propeller shaft remain still when in 4×2. Although the system provides for the comfort of an in-cab operation the free wheeling effect is only partial since a substantial number of parts is permanently connected to the wheels. The vehicle's axle must also be specially designed and engineered to accommodate the shaft split mechanism.

Applicant attempted to solve the inconveniences of the prior art devices by developing a totally automatic mechanical device incorporating engine braking as is disclosed in his Brazilian Patent PI-8102668, filed Apr. 30, 1981. In this automatic mechanical device, the wheels are connected automatically when the optional drive is actuated by means of the transfer case lever. Disconnection is accomplished by disengaging the optional drive, also through the transfer case lever. However, in order to disconnect the wheels completely, it is necessary to move the vehicle in the opposite direction to that of its previous movement.

Even though the automatic mechanical device described in the above patent did present some advantages when compared to other existing devices at that time, applicant continued his studies and research towards obtaining a more practical solution than the prior art since his automatic mechanical device still presented the inconveniences of having to move the vehicle in a direction contrary to that of its previous movement in order to completely disengage the wheels.

In order to eliminate this inconvenience, Applicant's assignee developed a totally novel device, described in U.S. Pat. No. 4,625,846, issued Dec. 2, 1986. In this patent, the "engaged" and "disengaged" modes of the improved device were accomplished automatically by means of fluid such as a pneumatic, hydraulic, or vacuum system, actuated by the user through a control valve placed inside the vehicle, coupled or not to the optional drive transfer case lever. The valve, then actuated, causes a pressure unbalance inside the device that generates the movement of the engaging/disengaging element thereby determining the release or connection of the wheels and the drive axles.

With this new device, the engagement or disengagement of the optional drive wheels is automatically accomplished, and there is no requirement for moving the vehicle in an opposite direction to that of its previous movement. This feature constitutes a significant advantage with respect to other known devices including applicant's earlier automatic mechanical device mentioned previously.

In this U.S. Pat. No. 4,625,846, several examples of constructive embodiments are illustrated, all of them being external in relation to the vehicle's wheel hub. This is so because a great number of such vehicles use axles of the type known as "full floating" (dead spindle) in which the drive axle extends through the inside of the spindle, which in turn is fixed onto the vehicle's suspension system. The wheel hub is externally located in relation to the spindle, by means of bearings. The connection between the drive axle and the wheel hub is generally accomplished by means of a drive flange or locking hub.

The configuration above described has been usual for several four wheel drive vehicles, but lately is being replaced by another lighter one, generally called "live spindle", in which the drive axle is internally positioned directly onto the suspension support by means of bearings, and the wheel hub is fixed onto the axle shaft permanently. This results in a smaller and lighter assembly, with less components, and consequently cheaper than the usual ones but, on the other hand, does not allow for the use of conventional locking hubs.

Furthermore, due to its constructive characteristics, this system is specially indicated for independent suspensioned vehicles. This requires the utilization of drive elements for disaligned axles, generally called "universal joints".

Thus, in the modern vehicles, with the configuration above it is not possible to mount the device improved by the Applicant in U.S. Pat. No. 4,625,846, since it was designed for installation on "full floating" axles.

In order to allow for the mounting of the device described in the above patent also on modern vehicles, in which the wheel hub is fixed directly onto the drive axle, Applicant continued his studies and research, and developed a further improvement. This improvement consists in locating the disconnecting device inboard of the wheel hub, between the universal joint and the axle shaft.

BRIEF SUMMARY OF THE INVENTION

The present invention relates to an improvement on a device for disconnecting the wheels from a vehicle's optional drive in which the device is located between the universal joint (Type Cardan, Rzeppa, Weiss, Tracta, Tripot, etc.) and the axle shaft, allowing its mounting on vehicles in which the wheel hub is directly fixed onto the axle shaft.

A feature of the present invention is to provide an automatic device for disconnecting the wheels from a vehicle's optional drive, according to which said device is mounted between the universal joint and the axle shaft of the vehicle.

Another feature of the present invention is that the connection or disconnection of the vehicle's wheels and their respective optional drive axles is achieved automatically by means of a pneumatic, hydraulic, or vacuum system, actuated by the user through a control valve placed inside the vehicle. The valve may or may not be coupled to the optional drive transfer case lever.

The valve, when actuated, causes a pressure unbalance inside the device that generates the movement of the engaging/disengaging element or member thereby determining the subsequent release or connection of the wheels and the axle shafts.

Another feature of the present invention is that the engagement or disengagement of the optional driving wheels is automatically accomplished and there is no requirement for moving the vehicle in the opposite direction to that of its previous movement.

Still another feature is to provide a simple, reliable, self contained free wheeling system, which is easy to install and is applicable on virtually any size or drive axle, or type of axle construction, i.e.: floating or semi-floating, live-spindle, etc.

Figure 1:
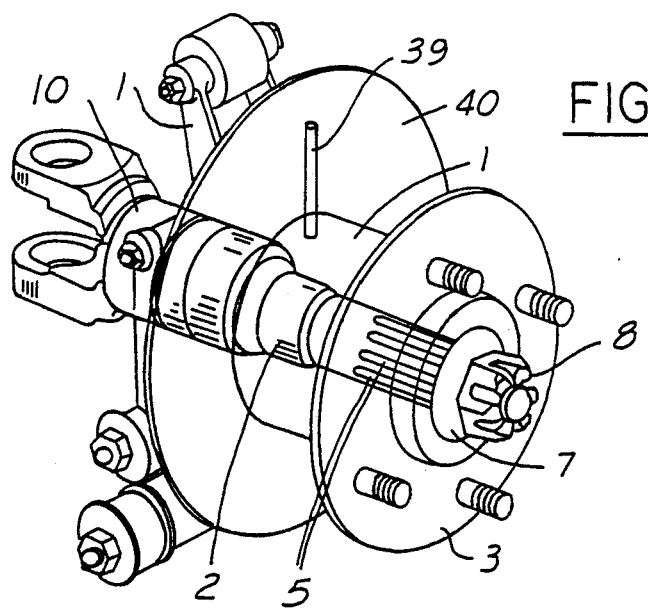
FIG. 1 is a schematic perspective view of the present device, mounted on a vehicle in which the wheel hub is fixed onto the axle shaft. The device for disconnecting the wheels is mounted between the universal joint and the axle shaft, which are specially adapted for this purpose.

It will be understood that the above drawings illustrate merely a preferred embodiment of the invention and that other embodiments are contemplated within the scope of the claims hereafter set forth.

DETAILED DESCRIPTION OF AN EMBODIMENT OF THE INVENTION

The present invention is used with vehicles that are equipped with more than one driving axle, according to which the components of the assembly are mounted inside the vehicle's support (1) of the axle shaft (2), and the vehicle's wheel hub (3) is fixed on the axle shaft (2) by means of internal splines (4) which are coupled to the external splines (5) provided on the axle shaft (2). Axially, the wheel hub (3) is fixed on one side, by means of a bearing (6), and on the opposite side, by means of a washer (7) and a nut (8), which are screwed onto the threaded end of the axle shaft (2). Said axle shaft (2) passes through the bearing (6), that can be a double conical roller bearing, a double angular contact bearing, two conical roller bearings or two angular contact bearings, which are placed inside the support (1) of the axle shaft (2), allowing free rotation between these two parts.

Axially, the axle shaft (2) is fixed by supporting its boss (2') in the bearing (6), and on the opposite end, screwing the same nut (8). Thus, the nut (8) fixes the washer (7), the wheel hub (3) and the bearing (6) on the axle shaft (2). The bearing (6) is axially fixed by supporting it on the internal shoulder (1') of the support (1), and on the opposite side, by supporting it on a snap ring (9) fitted into a groove provided on the support (1). A universal joint (10) is diametrically positioned in relation to the support (1) of the axle shaft (2) by means of a bearing (11), which can be, for instance, a needle bearing, placed between two races, one internal (12) and another external (13), both mounted between the universal joint (10) and the support (1), allowing free rotation between these two parts. The internal race (12) is axially fixed on one side, by means of a supporting disc (14), and on the other side, by means of a snap ring (15), fitted into a groove (16) provided in the universal joint (10).

To fix axially the universal joint (10), two thrust discs (17) and (18) are used, between which the supporting disc (14) is located. Both discs (17) and (18) rest on one side, against a face (1") of the support (1), and on the other side, on a snap ring (19), fitted into a groove (20) provided in the support (1). These sliding discs (17) and (18) can be replaced by axial bearings.

Figure 2:
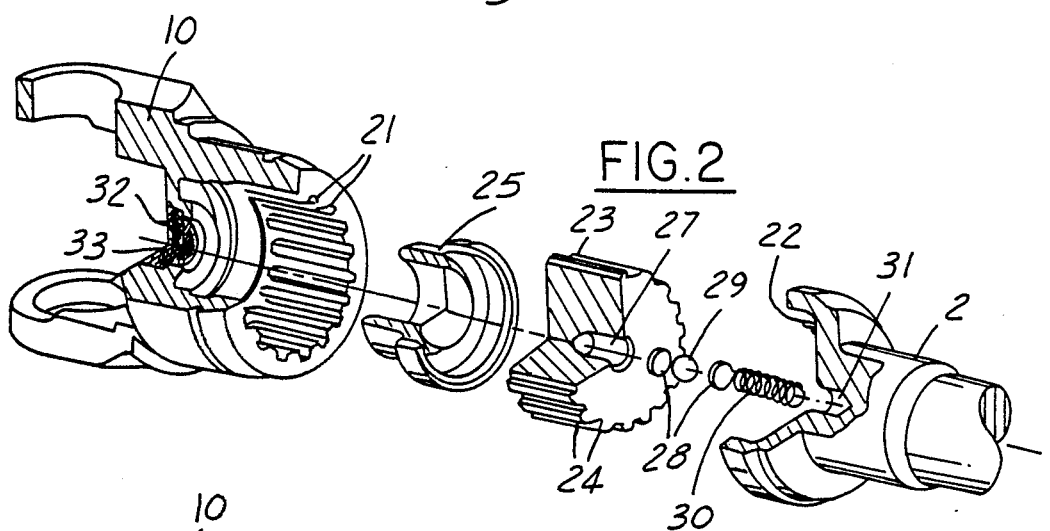
FIG. 2 is an exploded perspective view of the universal joint and the drive axle, depicting their internal construction where the components of the device are mounted.
Figure 4:
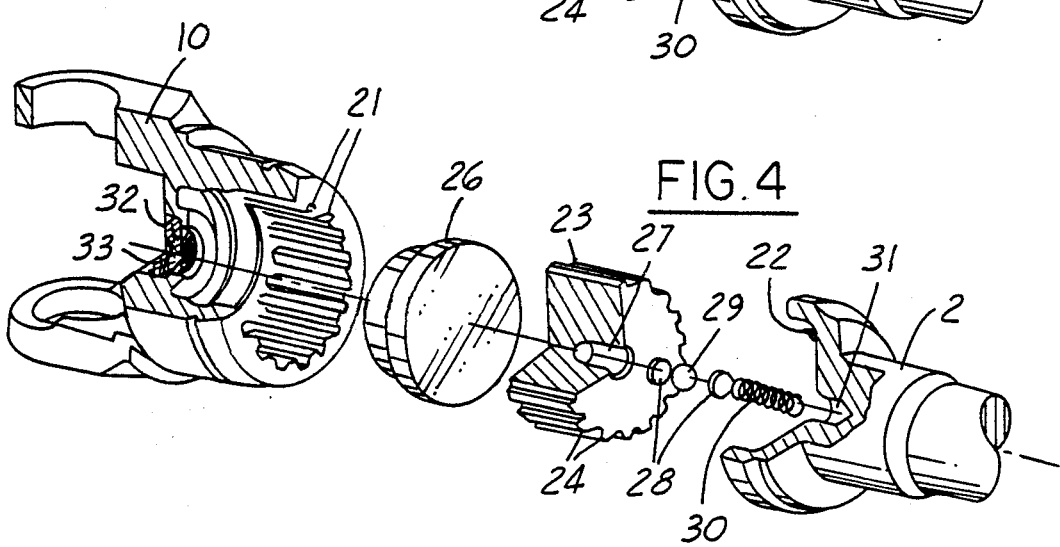
FIG. 4 is an exploded perspective view of the universal joint and the drive axle, similar to FIG. 2, depicting their internal construction and incorporating a modified hub assembly.

Internally, the universal joint (10) has spline part (21), similar to a internal splines (22) provided on the inboard end of the axle shaft (2). The spline part (21) and internal splines (22) form a housing wherein a sliding element can move to the engage and disengage modes or positions of the present device. This element is composed of a clutch disc (23), externally toothed (24), whoe teeth (24) match the internal teeth or splines (21) provided on the universal joint (10), as well as with the internal teeth or splines (22) provided on the axle shaft (2). This clutch disc (23) can slide inside the universal joint (10) and inside the axle shaft (2). This movement is limited on both sides by the ends of the spline part (21) and internal splines (22). Next to the clutch disc (23), in a first constructive embodiment, a diaphragm (25) is press fitted onto the internal diameter of the universal joint (10). In a second constructive embodiment, this diaphragm (25) is replaced by a piston (26), that also slides inside the joint (10), as shown in the bottom part of FIG. 2. The diaphragm (25) and the piston (26), each constitutes a "moveable member" as that term is used in the claims.

The clutch disc (23) has a blind hole (27) where a sphere (29), two thrust discs (28) and a compression spring (30) are mounted. Its opposite end is inserted into a blind hole (31) in axle shaft (2).

The universal joint (10) also has an orifice (32), which allows the permanent entering of atmospheric air inside the device. This air is filtered by a porous filter (33) press fitted in a recess provided on the universal joint.

The sealing of the assembly is accomplished on one side, by two seals (34) of the bearing (6), and a seal (35) between the support (1) of the axle shaft (2) and the wheel hub (3) is optionally used. On the other side, the sealing is accomplished by two seals (36) of the needle bearing (11), and a seal (37) between the support (1) of the axle shaft (2) and the internal race (12) of the needle bearing (11) is optionally used. The bearing (6) and the races (12) and (13) of the needle bearing (11) are mounted over a chemical gasket, both internally and externally.

The support (1) of the axle draft shaft (2) has an orifice (38) in which a tube (39) is fixed, that conducts the fluid (vacuum, air or oil) from the motor or auxiliary pump up to inside the device.

Figure 3:
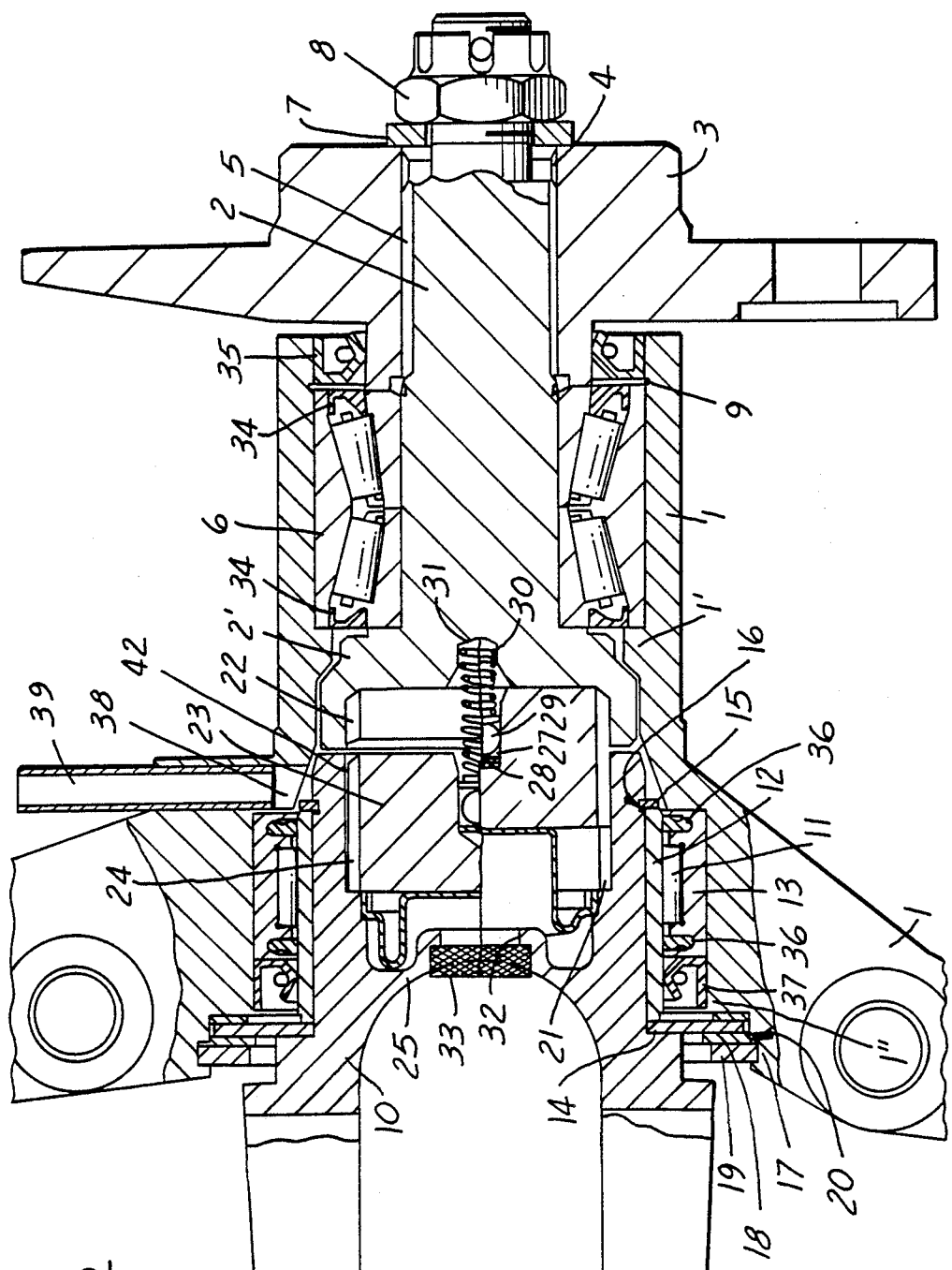
FIG. 3 is a longitudinal sectional view through the automatic free wheel hub assembly, illustrating both the engage and disengage positions of the device with respect to the center line of the assembly. The top part of the drawing shows the device in its disengaged position while the bottom part of the drawing shows the device in the engaged position.

With the unit or device in disengaged position, as illustrated on the top part of the FIG. 3, the spring (30) maintains the clutch disc (23) totally inserted inside the splined part (21) of the universal joint (10). Consequently, the external splines (24) of the clutch disc (23) is not meshed with the internal toothed cavity (22) of the axle shaft (2). This permits free rotation of the axle shaft (2) and the wheel hub (3), while the universal joint (10) and the clutch disc (23) remain motionless (at such time, the optional drive is disconnected). This is possible because the two sliding discs (28) and the sphere (29), act as an axial bearing, allowing relative rotation between clutch disc (23) and spring (30).

In this disengaged position, the pressure existing inside the chamber (A) is equal to that existing inside the chamber (B). For the device or assembly to shift to the engage position, a difference in pressure must be generated between these two chambers (A) and (B). This is obtained through vacuum, pneumatic or hydraulic pressure originated in the vehicle's intake system, or by an auxiliary pump. The term "fluid" as used herein and in the claims includes any type of vacuum, pneumatic or hydraulic source.

The flow of such fluids (vacuum, air or oil) is controlled by a control valve, not illustrated, that may or may not be connected to the optional drive actuating lever. The fluid is conducted from the engine or the auxiliary pump to the tube (39), that is fixed to the orifice (38) provided in the support (1) of the axle shaft (2). The fluid is conducted through the passage means (42) in the clutch disc (23) defined by the clearance existing between the splined cavity (21) of the universal joint (10) and the splined portion (24) of the clutch disc (23). The fluid reaches the chamber (A) and is prevented from leaking through the sealing system already described, constituted of the seals (34), (35), (36) and (37).

When the fluid from the power source (vacuum, air or oil) reaches the chamber (A), a difference in pressure between chamber (A) and chamber (B) is generated. The chamber (B) is always at atmospheric pressure, as it is connected to the atmosphere by means of the orifice (32). This difference in pressure causes the diaphragm (25), in the first constructive embodiment, or the piston (26), in the second embodiment, to move axially, "pushing" the clutch disc (23) towards the axle shaft (2), overcoming the spring (30) action. During this movement, part of the splined section (24) of the clutch disc (23) meshes with the splined section (22) of the axle shaft (2), while the other part of the splined section (24) remains meshed with the splined section (21) of the universal joint (10), as shown in the bottom part of the FIG. 3.

Once this engagement is accomplished, the disc (23) becomes the rotation union element between the universal joint (10) and axle shaft (2). Thus, these two parts start rotating together in unison (optional drive connected).

To re-establish the disengagement, all that is required is to interrupt the flow of fluid from the power source (vacuum, air or oil). This is accomplished through the control valve, that restores the equilibrium in pressure between the two chambers (A) and (B), allowing the spring (30) to push the clutch disc (23) towards the universal joint (10). During this movement, the splined section (24) of the clutch disc (23) is disengaged from the splined section (22) of the axle shaft (2). Thus, the unit or device remains disengaged, allowing the axle shaft (2) and the wheel hub (3) to turn completely free again, independent from the universal joint (10) and the cutch disc (23), which remain inactive.

With this new device or assembly, the engagement and disengagement of the optional drive wheels is done automatically, simultaneously or not with the actuation of the optional drive shift lever, avoiding the need of moving the vehicle in the opposite direction to its previous movement, thus allowing for greater user convenience and a more practical unit.

The free wheeling system just described offers all the advantages of the manual hub as well as those of the automatic ones of the prior art. The main advantages are: mounting in vehicles in which the wheel hub is fixed directly on the drive axle; mounting in vehicles in which the wheels have independent suspension system; in-cab operation at any speed; engine compression brake capability; entire optional power train motionless in 4×2; complete reliability; simple construction; ease of installation; no need of the driver to get out of the vehicle to lock or unlock the hubs; no need to reverse the vehicle to disengage hubs; in 4×2, optional axle wheels turn completely free from drive shaft; instantaneous positive locking and unlocking and operated; simultaneously with transfer case shifting.

Having described the invention, reference should not be had to the following claims:

I claim:

1. An automatic free wheeling hub assembly adapted for a four wheel drive vehicle to drivingly connect a wheel to the vehicle drive axle, said vehicle including a wheel hub mounted upon a drive axle shaft;

said hub assembly comprising a support having an axial bore through which the axle shaft extends;
a universal joint axially aligned with and spaced from said axle shaft and projected into said support;
means journalling said axle shaft upon said support;
means axially securing said axle shaft upon said support;
means journalling said universal joint upon said support;
means axially securing said universal joint to said support;
said axle shaft having at one end thereof internally splined teeth;
said universal joint having a cavity aligned with the axle shaft;
said universal joint at said cavity being provided with internally splined teeth matching and axially aligned with the internally splined teeth provided at said one end of said axle shaft;
an axially movable cylindrical clutch disc positioned within said cavity having an end face, said clutch disc having external teeth matching and movable along said internally splined teeth of said universal joint and being selectively engagable with the internally splined teeth provided at said one end of said axle shaft;
fluid responsive actuating means including a movable member mounted within said cavity and axially abutting said end face;
said movable member dividing said cavity into a pair of chambers upon its opposite sides;
a resilient element between said clutch disc and shaft axially biasing said clutch disc completely within the cavity of said universal joint, out of engagement with the internal teeth of said axle shaft;
said fluid responsive actuating means being responsive to a pressure differential in said chambers thereby moving said movable member and said clutch disc axially in said cavity overcoming said resilient element effecting engagement of the teeth of said clutch disc and said axle shaft, part of the teeth of said clutch disc remaining engaged with the internal teeth of said universal joint, said clutch disc functioning as a connecting element between said axle shaft and said universal joint;
said wheel hub and axle shaft, when disengaged from said clutch disc, being adapted to turn freely as a unit, independent from said clutch disc, support and universal joint.

2. In the hub assembly of claim 1 further comprising, the other end of said axle shaft being externally splined; said wheel hub having internal splines mounted on the externally splined end of said axle shaft.

3. In the hub assembly of claim 1 further comprising, means on said other end of said axle shaft axially securing said wheel hub to said axle shaft.

4. In the hub assembly of claim 1 further comprising, means securing and sealing said movable member within said cavity.

5. In the hub assembly of claim 1 further comprising, said movable member abutting said clutch disc as the disc moves in said cavity.

6. In the hub assembly of claim 1 further comprising, said support having an orifice adapted to be connected to a source of fluid and passage means in said disc for directing the fluid to said cavity.

7. In the hub assembly of claim 1 further comprising, means sealing said support and said universal joint.

8. In the hub assembly of claim 1 further comprising, means sealing said support to said axle shaft.

9. The automatic free wheeling hub assembly defined in claim 1 further comprising, said movable member being a flexible diaphragm with its peripheral edge fixed in said cavity.

10. The automatic free wheeling hub assembly defined in claim 1 further comprising, said movable member being a piston positioned in said cavity and axially movable and sealed therein.

11. The automatic free wheeling assembly defined in claim 1 further comprising, said resilient element being a coil spring fixed in said cavity and in said clutch disc.

12. The automatic free wheeling hub assembly defined in claim 1 further comprising, said resilient element being a compression coil spring supported on one side by said axle shaft and on the other side by said clutch disc, and an axial bearing between said spring and clutch disc.

13. The automatic free wheeling hub assembly defined in claim 1 further comprising, one chamber of said cavity being connected to atmosphere by a passage.

14. The automatic free wheeling hub assembly defined in claim 6 further comprising, said passage means in said clutch disc being a clearance between the external teeth of said clutch disc and the internally splined teeth of said universal joint.

15. The automatic free wheeling hub assembly defined in claim 1 further comprising, wherein the axial movement of said fluid responsive actuating means is accomplished by means of vacuum, pneumatic or hydraulic pressure.

16. A free wheeling hub assembly for disconnecting the wheels from a vehicle's optional drive having more than one driving axle, an elongated support (1), the components of the assembly being mounted within said support (1), an axle shaft (2) located within the support (1) and having internal teeth (22), a wheel hub (3) splined upon and secured to said shaft (2), a bearing (6) between the support (1) and shaft (2), a universal joint (10) diametrically positioned within and journalled upon the support (1) and having internal teeth (21), a clutch disc having external teeth (24) to match the internal teeth (21) on the universal joint (10), and the internal teeth (22) on the axle shaft (2), said clutch disc being slidable inside the universal joint (10) and inside the axle shaft (2).

17. The improved free wheeling hub assembly defined in claim 16 further comprising, a diaphragm (25) adjacent the clutch disc (23) which is press fitted into the internal diameter of the universal joint (10), the clutch disc (23) having a blind hole (27) receiving a sphere (29), a pair of thrust discs (28) and one end of a compression spring (30), with the opposite end of said compression spring (30) being inserted into a blind hole (31) in the axle shaft (2), said universal joint (10) having a permanent air entrance orifice (32), with air being filtered by a porous filter (33) located adjacent said orifice.

18. The improved free wheeling hub assembly defined in claim 17, further comprising a piston (26) adjacent the clutch disc (23), said clutch disc (23) having a blind hole (27) receiving a sphere (29), a pair of thrust discs (28) and one end of a compression spring (30), with the opposite end of said compression spring (30) being inserted into a blind hole (31) in the axle shaft (2), said universal joint (10) having a permanent air entrance orifice (32), with air being filtered by a porous filter (33) located adjacent said orifice.

19. The improved free wheeling hub assembly of claim 16, characterized in that the sealing of the assembly includes seals (34) of the bearing (6) and a seal (35) between the support (1) of the axle shaft (2) and the wheel hub (3) and seals (36) of the needle bearing (11).

20. The improved free wheeling hub assembly of claim 16, characterized in that the support (1) has an orifice (38) receiving a tube (39) that conducts the fluid from the motor or auxiliary pump of the vehicle to the interior of the cavity.

* * * * *